April 20, 1965  E. L. HANSON  3,179,942
ANTENNA STABILIZING APPARATUS
Filed Jan. 28, 1963  2 Sheets-Sheet 2
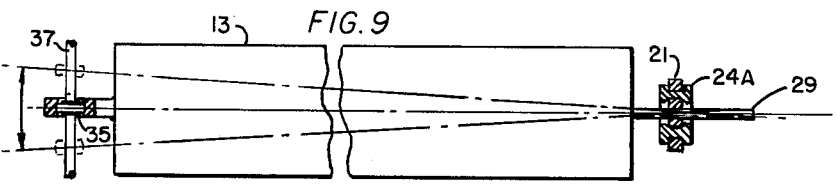
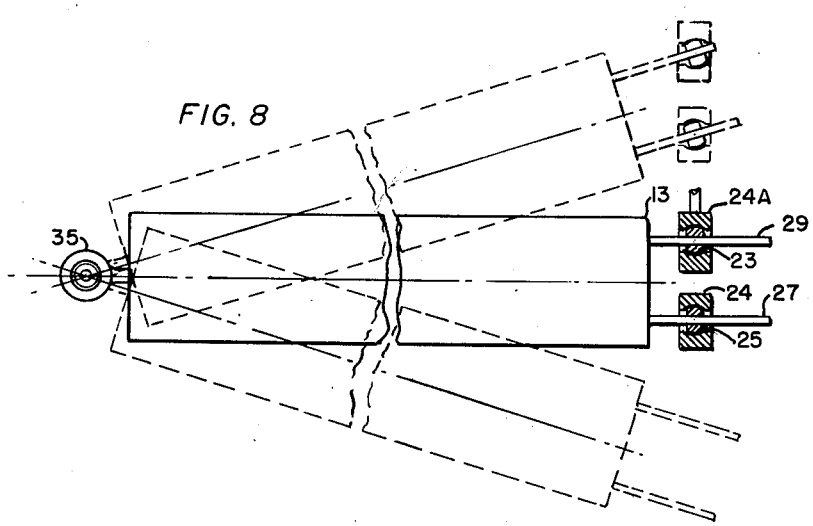
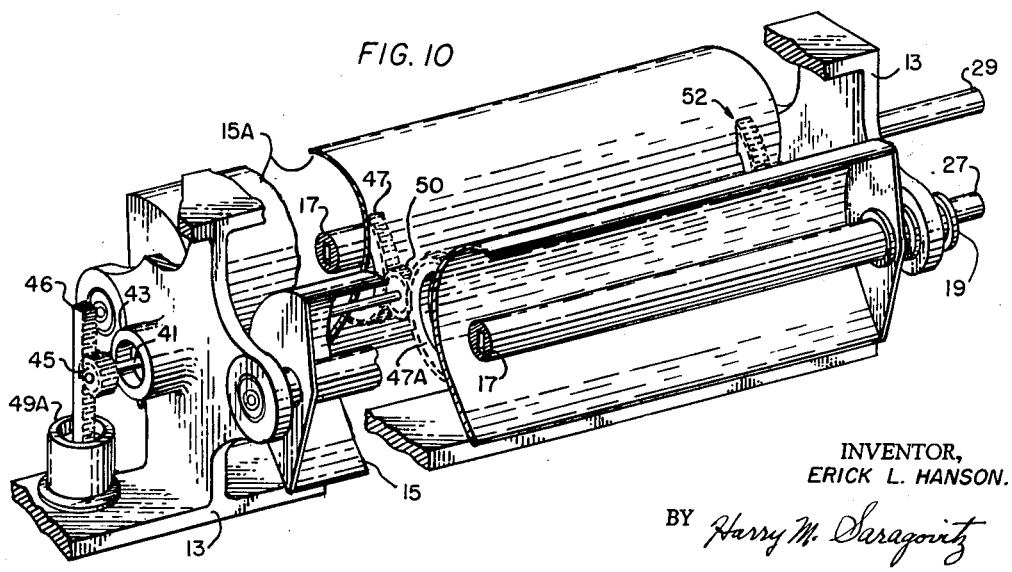
INVENTOR,
ERICK L. HANSON.
BY Harry M. Saragovitz
ATTORNEY.

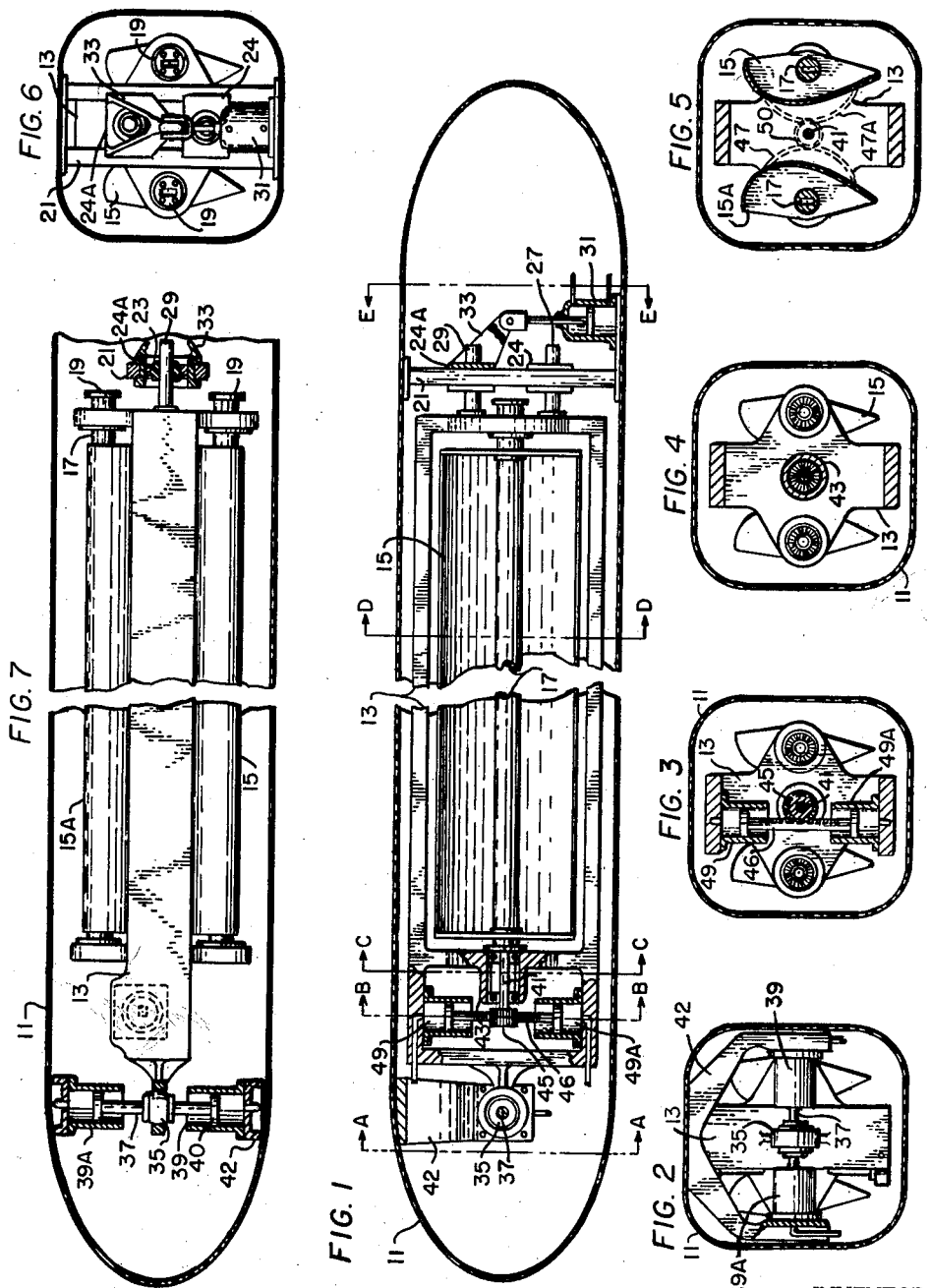

United States Patent Office 3,179,942
Patented Apr. 20, 1965

3,179,942
ANTENNA STABILIZING APPARATUS
Erick L. Hanson, Lincroft, N.J., assignor to the United States of America as represented by the Secretary of the Army
Filed Jan. 28, 1963, Ser. No. 254,515
1 Claim. (Cl. 343—756)
(Granted under Title 35, U.S. Code (1952), sec. 266)

The invention described herein may be manufactured and used by or for the Government for governmental purposes, without the payment of any royalty thereon.

The invention herein relates to an aircraft antenna support, and more specifically to a means for stabilizing a radar antenna, which is affixed to said aircraft and subject to deviation from level flight. In the application herein, it is shown and described as applied to a side-looking radar antenna mounted on an aircraft.

According to conventional practice, airborne radio object-locating equipment is mounted to an aircraft structure, and the equipment changes position and orientation when the aircraft deviates from level flight. As is well known in the art, such deviation from normal flight may be produced by turbulent weather conditions or other causes. Such change in course, whether due to pitch, yaw or roll, either separately or simultaneously, changes the position of the aircraft and its associated radar equipment, including its antenna, with respect to the ground, and deviations are produced in the presentation on an indicator associated with the radar equipment. Accordingly, data obtained during such time may be impaired to the extent of such deviations.

To compensate for such detrimental effects on operational accuracy of the radar equipment produced by deviations from normal flight, resort has been had to various expedients. Various forms and types of mechanical and electro-mechanical devices have been proposed to compensate for deviation in pitch, yaw and roll of the aircraft from its normal flight. However, as far as is known, such devices are usually directed to compensate for but one, or at the most, two of such deviations.

It is therefore a primary object of the present invention to provide a stabilizing system for aircraft radar equipment that can simultaneously or separately compensate for any deviation from normal flight caused by pitch, roll or yaw.

Another object of the invention is to provide a stabilizing system for an aircraft radar equipment which has a minimum of structural and component parts and is reliable in its operation.

It is yet another object of the invention to provide a stabilizing mechanism which is compact, of light weight, lends itself to ready assembly with the radar antenna, is relatively inexpensive to make and install, and is readily accessible for any adjustment and repair.

The novel features which are believed to be characteristic of the invention, both as to its organization and method of operation, together with further objects and advantages thereof, will be better understood from the following description considered in connection with the accompanying drawings in which the invention is illustrated by way of example. It is to be expressly understood, however, that the drawings are for purpose of illustration and description only, and are not intended as a definition of the limits of the invention.

In the drawings:
FIG. 1 is a side elevational view of a stabilization system for a radar antenna;
FIG. 2 is a section taken on the line A—A of FIG. 1;
FIG. 3 is a section taken on the line B—B;
FIG. 4 is a section taken on the line C—C;
FIG. 5 is a section taken on the line D—D;
FIG. 6 is a section taken on the line E—E;
FIG. 7 is a top view of the device shown in FIG. 1;
FIG. 8 is a view showing the several positions of the antenna assembly at selected intervals when compensating for pitch;
FIG. 9 is a top view showing movement of the antenna assembly when compensating for yaw; and
FIG. 10 is a view in perspective showing in part the means for compensating for roll.

Referring particularly to FIGS. 1 and 7, there is shown a cowling 11 which serves as a casing for the radar antenna and its associated stabilization system. The cowling 11, made of fiberglass, plastic, or of any suitable material that will permit entry of a radar beam, is suitably secured to the underside of an aircraft. Within the cowling 11 is a movable housing 13 and contained in said housing are a pair of identical elongated antenna reflector elements shown at 15 and 15A. Each of the antenna elements includes a radiator 17 and an associated R.F. coupling device such as shown at 19.

For providing any compensation in pitch of the aircraft antenna from its normal position, the following means is provided. Securely affixed within the cowling 11 is a bar 21 that extends between opposing inner sides of the cowling and slightly spaced from one end thereof. Slidably engageable on the bar 21 are spherical bearings 23 and 25. Such spherical bearings, which are commercially available, are mounted in slides 24 which ride on the bar 21 to permit a shaft to be both slidable and rotatable therein, either separately or concurrently. In such regard, there are respectively within the bearings 23, 25 two spaced discrete parallel shafts shown at 27 and 29. As indicated, one end of the shafts 27, 29 are confined in their separate bearings 23, 25, and their other ends extend to and slightly through the antenna housing 13, thus serving to support that end of the antenna housing and the antenna elements therein. Slightly spaced from the bar 21 is a hydraulic cylinder 31 and including a link arm 33 that is secured at one of its ends to the piston arm of cylinder 31 and its other end to the spherical bearing slide 24A. It is thus apparent that any movement of the piston arm will be imparted to the slide 24A, the shaft 29 therein and antenna housing 13. Since the shafts 27 and 29, though independently operable, are supported in a common framework, longitudinal movement of the shaft 29 will also move shaft 27. Actuation of the cylinder 31, to effect a change in position of the antenna, is accomplished by the use of a selsyn or servo motor operated valve to control the input and exhaust of the hydraulic fluid to the cylinder. Operation of the valve is in turn controlled by a gyro or similar device located in the aircraft. Since the operation of and the functions performed by such gyro devices and servo motors are known in the art, no detailed description or showning thereof is believed necessary.

As has been heretofore described, one end of the antenna housing is supported by the two parallel shafts 27, 29. The opposite end of the antenna housing is supported by a spherical bearing 35 which functions in the same manner as the spherical bearings 23, 25. By the use of the spherical bearing mountings 23, 25 and 35 the antenna housing assembly can be elevated or dropped from level flight to the positions shown in dotted outline, in FIG. 8, when actuated by operation of the cylinder 31 which in turn is controlled by gyro a servo system as heretofore described.

Compensation for yaw is accomplished by the device in the following manner. The spherical bearing 35 is secured on a movable transverse shaft 37. Movement of the shaft to the left or right is accomplished by a pair of hydraulic cylinders 39 and 39A each of which include respective pistons 40 which are integrally connected to the shaft 37. The cylinders, 39, 39A are held in a framework 42. As heretofore described in the operation of the cylinder 31, the cylinders 39 and 39A operate in like manner, that is, by a remote gyro servo system that will indicate any yaw deviations and convey such information to the cylinders. In turn, the cylinders will function to move the shaft 37 to the desired position.

Compensation for roll of the aircraft scanning device from its normal pattern is accomplished by the following means. In this regard attention is directed to FIG. 1, and particularly FIG. 10. Extending longitudinally through the housing 13 is a shaft 41 rotatable in a bearing 43. Affixed to the end of the shaft, and rotatable therewith, is a gear 45. Within the housing 13 is a pair of opposing hydraulic cylinders 49, 49A, whose actuation and control is similar to the hydraulic cylinders heretofore described. Each of the pistons of the cylinders 49, 49A are provided with a toothed face or rack as shown at 46 and so positioned as to be in constant meshing engagement with the gear 45. Also on the shaft 41 and rotatable therewith is a pinion 50 located between the rear wall surfaces of the oppositely disposed antenna elements 15. Affixed to the rear of each of the antenna elements are gear segments 47, 47A which are in meshed engagement with the pinion 50. Any number of such pinion and gear segment arrangements may be provided such as shown at 52. The gear segments 47, 47A are so located on the antenna elements that their discrete centers are the rotational centers of the antenna radiator elements. The operation of such system to compensate for roll of the aircraft will be apparent. Any movement of the piston arms 46 will be imparted to the gear 45 and the shaft 41. At the same time movement of pinion 50 in engagement with the gear segments 47, 47A will effect a rotational change in position of the antenna elements 15 so that the attitude of the antenna elements is maintained at a constant level plane.

In the operation of each of the hydraulic systems heretofore described, it is to be understood that appropriate cut off valves are provided to limit the movement of such systems.

While there has been herein described a stabilization system for an antenna wherein the actuation and movement of the several mechanical components is accomplished with the use of hydraulic cylinders, it is obvious that other devices may be utilized to effect the various movements of the antenna housing 13 and the antenna. Such devices may include an electrical system including a slave motor operated by the gyro-selsyn system.

What is claimed is:

A universally mounted antenna system for stabilizing the deviation of a scanning device mounted in the cowling of an aircraft caused by pitch, yaw and roll of said scanning device and wherein said scanning device includes a pair of oppositely disposed reflectors having opposing gear segments on their respective rear walls comprising:

a movable housing in said cowling within which said scanning device is contained, a first spherical bearing extending from one end of said housing and affixed thereto, a first shaft extending through said first spherical bearing and movable therewith, a first power actuated means, responsive to deviation in yaw of said scanning device, in engagement with said first shaft and including discrete pistons operatively associated with the discrete ends of said first shaft for moving said shaft linearly whereby the deviation in yaw of said scanning device is compensated, a bar extending between the sides of said cowling at the other end thereof, second and third spherical bearings spaced and aligned in said bar and slidably engageable therein, second and third spaced shafts respectively mounted in said second and third spherical bearings and having their corresponding ends affixed to said housing, a second power actuated means responsive to deviation in pitch of said scanning device and including a linking arm between said second power actuated means and at least one of said second or third spherical bearings whereby the deviation in pitch of said scanning device from the stabilized position is compensated, a fourth shaft intermediate the rear walls of the reflectors, a first pinion gear and a second pinion gear on said fourth shaft and rotatable therewith, said first pinion gear terminating one end of said fourth shaft and said second pinion gear being in operative engagement with the gear segments on the rear walls of said reflectors, a third power actuated means, including discrete pistons, responsive to deviation in roll of said scanning device and including a rack interconnecting said pistons and in engagement with said first pinion gear whereby movement of said first pinion gear will effect rotational movement of said reflectors to compensate for any deviation in roll of said scanning device.

References Cited by the Examiner
UNITED STATES PATENTS
3,084,342   4/63   Fuller et al. _____ 343—761

BROUGHTON G. DURHAM, *Primary Examiner.*